United States Patent (10) Patent No.: US 8,695,108 B2
Takeshi et al. (45) Date of Patent: Apr. 8, 2014

(54) IN-LIQUID POTENTIAL MEASUREMENT DEVICE AND ATOMIC FORCE MICROSCOPE

(75) Inventors: Fukuma Takeshi, Ishikawa (JP); Kobayashi Naritaka, Ishikawa (JP); Asakawa Hitoshi, Ishikawa (JP)

(73) Assignee: National University Corporation Kanazawa University, Kanazawa-shi, Ishikawa (JP)

( * ) Notice: Subject to any disclaimer, the term of this patent is extended or adjusted under 35 U.S.C. 154(b) by 0 days.

(21) Appl. No.: 13/882,901

(22) PCT Filed: Jul. 29, 2011

(86) PCT No.: PCT/JP2011/004325
§ 371 (c)(1),
(2), (4) Date: May 1, 2013

(87) PCT Pub. No.: WO2012/060033
PCT Pub. Date: May 10, 2012

(65) Prior Publication Data
US 2013/0232648 A1 Sep. 5, 2013

(30) Foreign Application Priority Data
Nov. 5, 2010 (JP) .................................. 2010-248744

(51) Int. Cl.
*G01Q 70/04* (2010.01)
*G01Q 10/00* (2010.01)

(52) U.S. Cl.
USPC ............. 850/19; 850/1; 850/2; 850/6; 850/36

(58) Field of Classification Search
USPC .......................................... 850/1, 2, 6, 19, 36
See application file for complete search history.

(56) References Cited

U.S. PATENT DOCUMENTS 5,371,365 A * 12/1994 Watanabe et al. .................. 850/1
5,874,668 A * 2/1999 Xu et al. .......................... 73/105
(Continued)

FOREIGN PATENT DOCUMENTS

| JP | 2000-346782 | 12/2000 |
| JP | 2007-205964 | 8/2007 |
| JP | 2010-66140 | 3/2010 |
| JP | 2011-53018 | 3/2011 |

OTHER PUBLICATIONS

International Search Report issued Aug. 23, 2011 in corresponding International Application No. PCT/JP2011/004325.

(Continued)

*Primary Examiner* — David A Vanore
(74) *Attorney, Agent, or Firm* — Wenderoth, Lind & Ponack, L.L.P.

(57) ABSTRACT

To measure surface potentials in a liquid, the in-liquid potential measurement device according to the present invention includes: a cantilever having a probe at its free end; a displacement measurement unit that measures a voltage corresponding to a displacement of a tip of the cantilever; an AC source that applies an AC voltage between the probe and the sample; and a signal detection unit. A frequency of the AC voltage is 10 kHz or higher. The signal detection unit detects, from the voltage measured by the displacement measurement unit, an amplitude of a frequency component having the same frequency as that of the AC voltage, an amplitude of a frequency component having double frequency of that of the AC voltage, and a frequency component having the same phase as that of the frequency of the AC voltage.

4 Claims, 9 Drawing Sheets

(56) References Cited

U.S. PATENT DOCUMENTS

| | | | |
|---|---|---|---|
| 6,002,131 A * | 12/1999 | Manalis et al. | 850/1 |
| 6,798,226 B2 * | 9/2004 | Altmann et al. | 850/19 |
| 7,098,678 B2 * | 8/2006 | Altmann et al. | 850/2 |
| 7,312,619 B2 * | 12/2007 | Altmann et al. | 850/1 |
| 7,735,146 B2 * | 6/2010 | Vertes et al. | 850/9 |
| 7,874,202 B2 * | 1/2011 | Matsumoto et al. | 73/105 |
| 8,341,760 B2 * | 12/2012 | Fukuma et al. | 850/1 |
| 8,418,261 B2 * | 4/2013 | Kasai et al. | 850/9 |
| 8,505,111 B2 * | 8/2013 | Asakawa et al. | 850/54 |
| 2010/0257642 A1 * | 10/2010 | Honbo et al. | 850/1 |
| 2011/0048115 A1 * | 3/2011 | Ota et al. | 73/64.56 |
| 2012/0047610 A1 * | 2/2012 | Kim | 850/6 |
| 2013/0232648 A1 * | 9/2013 | Fukuma et al. | 850/36 |

OTHER PUBLICATIONS

Osamu Takeuchi et al., "Kelvin Probe Force Microscopy without Bias-Voltage Feedback", Japanese Journal of Applied Physics, vol. 46, No. 8B, Aug. 23, 2007, pp. 5626-5630.

M. Nonnenmacher et al., "Kelvin probe force microscopy", Applied Physics Letters, vol. 58, No. 25, Jun. 24, 1991, pp. 2921-2923.

Shin'ichi Kitamura et al., "High-resolution imaging of contact potential difference with ultrahigh vacuum noncontact atomic force microscope", Applied Physics Letters, vol. 72, No. 24, Jun. 15, 1998, pp. 3154-3156.

* cited by examiner

IN-LIQUID POTENTIAL MEASUREMENT DEVICE AND ATOMIC FORCE MICROSCOPE

TECHNICAL FIELD

The present invention relates to potential measurement devices using atomic force microscope, and more particularly to an in-liquid potential measurement device.

BACKGROUND ART

An atomic force Microscope (hereinafter, referred to as an AFM) is a device that uses, as a force sensor, a cantilever with a sharp tip (probe) at its end to generate fine image of uneven sample surface (for example, see Patent Literature 1).

More specifically, when the probe of the cantilever is brought into proximity of a sample, interaction force is exerted between the probe and the sample. The interaction force is detected, and the position of the probe in perpendicular to the sample is controlled to keep the interaction force constant. In this state, when the probe is scanned in parallel to the sample, the probe is oscillated across the uneven surface of the sample. The AFM records the contours of the surface at positions in the parallel direction to generate an image of the uneven sample surface.

Depending on the method of detecting the probe-to-sample interaction force by using the cantilever, the AFM can be operated in two kinds of operation modes: (A) static mode and (B) dynamic mode.

The AFM in the static mode detects probe-to-sample interaction force according to a displacement of the cantilever caused by the probe-to-sample interaction force.

The AFM in the dynamic mode, on the other hand, detects probe-to-sample interaction force according to oscillation amplitude, frequency, or change in phase which result from the probe-to-sample interaction force when the cantilever is mechanically oscillated at a frequency at or close to its resonance frequency to be scanned in parallel to the sample.

There is a known method of measuring potential distribution on an uneven sample surface as well as image of the uneven sample surface by using these AFMs (for example, see Non Patent Literature 1).

FIG. 6 is a schematic diagram showing the principle of Kelvin Probe Force Microscopy (hereinafter, referred to as "KPFM") which is widely known as a potential measurement device using the AFM.

As shown in FIG. 6, a KPFM 800 includes a cantilever 204, a probe 223, a sample 205, an AC source 201, and a DC source 952.

The cantilever 204 has a sharp tip (probe) 223 at its end. The cantilever has one free end with the probe and the other fixed end.

The sample 205 is an object to be measured which is set in air or vacuum.

The AC source 201 is a power-supply device that applies an AC bias voltage denoted as $V_{ac} \cos(\omega_m t)$ between the probe 223 and the sample 205. Here, $V_{ac}$ denotes an amplitude of the AC voltage, and $\omega_m$ denotes a frequency of the AC voltage.

The DC source 952 is a power-supply device that applies a DC bias voltage denoted as $V_{dc}$ between the probe 223 and the sample 205.

On the surface of the sample 205, potential distribution $V_s$ exists due to distribution of electric charges, polarization, work function, and the like. Therefore, a probe-to-sample potential difference $V_{ts}$ after applying bias voltages by the AC source 201 and the DC source 952 is determined by following Equation 1.

[Math. 1]

$$V_{ts} = V_{dc} - V_s + V_{ac}\cos(\omega_m t) \quad \text{(Equation 1)}$$

In Equation 1, the direction from the top surface to the rear surface of the sample 205 is considered as a positive direction, assuming that the top surface is a surface facing the probe 223 and the rear surface is the other surface among the both surfaces of the sample 205. A coordinate axis of this direction is hereinafter referred to as a z axis. If a probe-to-sample electrostatic capacitance is $C_{ts}$, probe-to-sample electrostatic force $F_{es}$ is determined by following Equation 2.

[Math. 2]

$$\begin{aligned}F_{es} &= \frac{1}{2}\frac{\partial C_{ts}}{\partial z}V_{ts}^2 \\ &= \frac{1}{2}\frac{\partial C_{ts}}{\partial z}[(V_{dc}-V_s)^2 + \\ &\quad \frac{1}{2}V_{ac}^2 + 2(V_{dc}-V_s)V_{ac}\cos(\omega_m t) + \frac{1}{2}\end{aligned} \quad \text{(Equation 2)}$$

As seen in Equation 2, $F_{es}$ includes (1) DC components (the first and second members on the right-hand side of Equation 2), (2) $\omega_m$ component (the third member on the right-hand side of Equation 2) among AC components, (3) $2\omega_m$ component (the fourth member on the right-hand side of Equation 2) among AC components.

Here, $F_{es}$ can be measured as displacement, oscillation amplitude, frequency, or change in phase of the cantilever. The KPFM 800 detects only the $\omega_m$ component (namely, the third member on the right-hand side of Equation 2) included in the measured $F_{es}$, by using a lock-in amplifier (not shown).

As seen in Equation 2, as the $\omega_m$ component is proportional to $(V_{dc}-V_s)$, feedback control is performed on $V_{dc}$ to cancel (set to zero) the $\omega_m$ component to always establish $V_{dc}=V_s$. In this condition, the probe 223 is scanned in parallel to the sample 205 and values of $V_{dc}$ are recorded at positions of the probe in parallel to the sample to generate image of potential distribution of the surface of the sample 205.

Another known potential measurement device using AFM is Scanning Maxwell Stress Microscopy (hereinafter, referred to as SMM).

Although the SMM measures an electrical potential (hereinafter, referred to as a "potential") of a surface based on the same principle as that of the KPFM, the SMM differs from the KPFM in the method of controlling a probe-to-sample distance. In the same manner as the typical AFM in dynamic mode, the KPFM controls positions of the probe 223 in perpendicular to a sample to keep constant oscillation amplitude, frequency, or change in phase of the cantilever. The SMM, however, controls positions of the probe in perpendicular to a sample to keep constant $2\omega_m$ component (the fourth member on the right-hand side of Equation 2) occurred by an AC bias voltage.

CITATION LIST

Patent Literature

[PTL 1] Japanese Unexamined Patent Application Publication No. 2000-346782

Non Patent Literatures

[NPL 1] M. Nonnenmacher, M. P. O'Boyle and H. K. Wickramasinghe, Appl. Phys. Lett., 1991, Vol. 58 pp. 2921-2923

[NPL 2] Shin'ich Kitamura and Masashi Iwatsuki, High-resolution imaging of contact potential difference with ultrahigh vacuum noncontact atomic force microscope, Applied Physics Letters, 1998, Vol, 72, pp. 3154-3156

[NPL 3] Osamu Takeuchi, Yoshihisa Ohrai, Shoji Yoshida, and Hidemi Shigekawa, Kelvin Probe Force Microscopy without Bias-Voltage Feedback, Japanese Journal of Applied Physics, 2007, Vol. 46, pp. 5626-5630

SUMMARY OF INVENTION

Technical Problem

However, the conventionally-known potential measurement techniques have been applicable only when the sample 205 is set in vacuum or in air, and it has been difficult to use the potential measurement techniques to measure the sample 205 in a liquid for the following reasons.

The potential measurement devices using AFM, such as KPFM or SMM, apply a DC bias voltage and an AC bias voltage between the probe 223 and the sample 205 as described previously.

As a result, if the DC bias voltage and the AC bias voltage are applied between the probe and the sample in a liquid, the following problems occur.

(1) ions in a liquid are reallocated to form an electric double layer on the surface of the sample 205 or the probe 223, thereby canceling electric field. As a result, it is impossible to measure surface potentials of the sample 205, (2) Density gradient of solvent or solute which is caused by ion reallocation causes osmotic pressure distribution and results in convection of the solvent or solute. Therefore, a relaxation time period is very long (for example, ten seconds or more). As a result, it is difficult to scan the entire sample 205 in a practical time period.

(3) Electrochemical potentials of the probe 223 and the sample 205 are changed to cause undesired electrochemical reaction. This occurs uncontrollable interaction force in the probe 223. Furthermore, this greatly affects the physical surface properties of the sample 205 to be measured. Moreover, as the result of the ion reallocation and the electrochemical reaction which occur at or close to the surface of the cantilever 204, the surface energy is changed and therefore the surface stress occurs in the cantilever 204. As a result, accuracy in measurement is significantly deteriorated.

It is known that the above various problems occur in the conventional techniques.

In order to solve the above problems, an object of the present invention is to provide an in-liquid potential measurement device capable of measuring surface potentials in a liquid.

Solution to Problem

In accordance h an aspect of the present invention for achieving the object, there is provided an in-liquid potential measurement device that measures a surface potential of a sample in a liquid, the in-liquid potential measurement device comprising: an electrode; an electrostatic force measurement unit configured to measure a voltage corresponding to electrostatic force between the electrode and the sample; an AC source that applies an AC voltage between the electrode and the sample; and a signal detection unit configured to detect signals of certain frequency components from the voltage measured by the electrostatic force measurement unit, and output values corresponding to the detected signals, wherein a frequency of the AC voltage applied by the AC source is 10 kHz or higher, and the signal detection unit is configured to detect, from the voltage measured by the electrostatic force measurement unit, (1) an amplitude of a frequency component having a same frequency as a frequency of the AC voltage applied by the AC source, (2) an amplitude of a frequency component having a frequency that is twice as high as the frequency of the AC voltage, and (3) a frequency component having a same phase as a phase of the frequency that is the same as the frequency of the AC voltage.

With the above structure, the use of the AC bias voltage having the frequency of 10 kHz or higher can significantly suppress reaction, such as electrochemical reaction and reallocation of solute, solvent, ions, and electric charges, which causes a problem in measuring a potential in a liquid. In addition, the signal detection unit detects three kinds of signals corresponding to an absolute value of the surface potential and its positive and negative values, and is thereby capable of suppressing influence of deterioration of a signal-to-noise ratio (S/N ratio) of the detected signals in in-liquid measurement. As a result, it is possible to measure surface potentials in a liquid.

It is also possible that the in-liquid potential measurement device further includes a capacitor in a closed circuit that applies a bias voltage between the electrode and the sample.

With the above structure, the capacitor functions to remove DC components from the AC bias voltage to completely prevent reaction such as electrochemical reaction and reallocation of solute, solvent, ions, and electric charges in a liquid. As a result, it is possible to improve an accuracy in measuring surface potentials in a liquid.

It is further possible that the in-liquid potential measurement device further includes a potential calculation unit configured to calculate the surface potential of the sample based on the values outputted by the signal detection unit, wherein the potential calculation unit is configured to calculate $V_s$ that is the surface potential of the sample, by Equation $V_s = \mathrm{sgn}(X_1) \times (A_1/A_2) \times (V_{ac}/4)$, where (1) $A_1$ is the amplitude of the frequency component having the same frequency as the frequency of the AC voltage applied by the AC source, the amplitude being detected from the voltage measured by the displacement measurement unit, (2) $A_2$ is the amplitude of the frequency component having the frequency that is twice as high as the frequency of the AC voltage, the amplitude being detected from the voltage measured by the displacement measurement unit, (3) $X_1$ is the frequency component having the same phase as the phase of the frequency that is the same as the frequency of the AC voltage, the frequency component being detected from the voltage measured by the displacement measurement unit, and (4) $V_{ac}$ is an amplitude of the AC voltage.

With the above structure, a surface potential is calculated and outputted based on three kinds of signals, which are detected and outputted by the signal detection unit, and an amplitude of the AC bias voltage. As a result, an accuracy in measuring surface potentials in a liquid is improved.

It is still further possible that an atomic force microscope that measures (a) a surface potential of a sample in a liquid and (b) a height of a surface of the sample, the atomic force microscope comprising: a cantilever having a cantilever structure including a free end with a sharp probe; an AC source that applies a bias voltage between the sharp probe and the sample; an actuator that oscillates the cantilever; a displacement measurement unit configured to measure a voltage corresponding to a displacement of the end of the cantilever; a signal detection unit configured to detect signals of certain frequency components from the voltage measured by the displacement measurement unit, and output values of the detected signals; a scanner unit configured to adjust a distance between the sharp probe and the sample; and a control unit configured to obtain an oscillation frequency of the cantilever oscillated by the actuator from the voltage measured by the displacement measurement unit, and perform feedback control on the scanner unit to keep the obtained oscillation frequency of the cantilever constant, wherein a frequency of an AC voltage applied by the AC source is 10 kHz or higher, the signal detection unit is configured to detect, from the voltage measured by the displacement measurement unit, (1) an amplitude of a frequency component having a same frequency as a frequency of the AC voltage applied by the AC source, (2) an amplitude of a frequency component having a frequency that is twice as high as the frequency of the AC voltage, and (3) a frequency component having a same phase as a phase of the frequency that is the same as the frequency of the AC voltage, and the control unit is configured to output, as the height of the surface of the sample, an amount of adjustment in the distance between the sharp probe and the sample which is performed by the scanner unit.

With the above structure, it is possible to obtain information (unevenness information) in a height direction of the surface, at the same time of measuring the surface potential. As a result, an atomic force microscope having an in-liquid potential measurement function can be implemented.

It should be noted that the present invention can be implemented into not only the above-described in-liquid potential measurement device but also an in-liquid potential measurement method including steps performed by the characteristic units included in the in-liquid potential measurement device, or a program causing a computer to execute such characteristic steps. Of course, the program can be distributed via a recording medium such as a Compact Disc-Read Only Memory (CD-ROM) or via a transmission medium such as the Internet.

It should also be noted that a part or all of the functions in the above-described in-liquid potential measurement device may be implemented into a semiconductor integrated circuit (LSI) or an atomic force microscope (AFM) including the in-liquid potential measurement device.

Advantageous Effects of Invention

Thus, the present invention can provide an in-liquid potential measurement device capable of measuring surface potentials in a liquid.

DESCRIPTION OF EMBODIMENTS

The following describes embodiments according to the present disclosure with reference to the drawings. It should be noted that all the embodiments described below are specific examples of the present disclosure. Numerical values, shapes, materials, constituent elements, arrangement positions and the connection configuration of the constituent elements, steps, the order of the steps, and the like described in the following embodiments are merely examples, and are not intended to limit the present disclosure. The present disclosure is characterized by the appended claims. Therefore, among the constituent elements in the following embodiments, constituent elements that are not described in independent claims that show the most generic concept of the present disclosure are described as elements constituting more desirable configurations, although such constituent elements are not necessarily required to achieve the object of the present disclosure.

Figure 1:
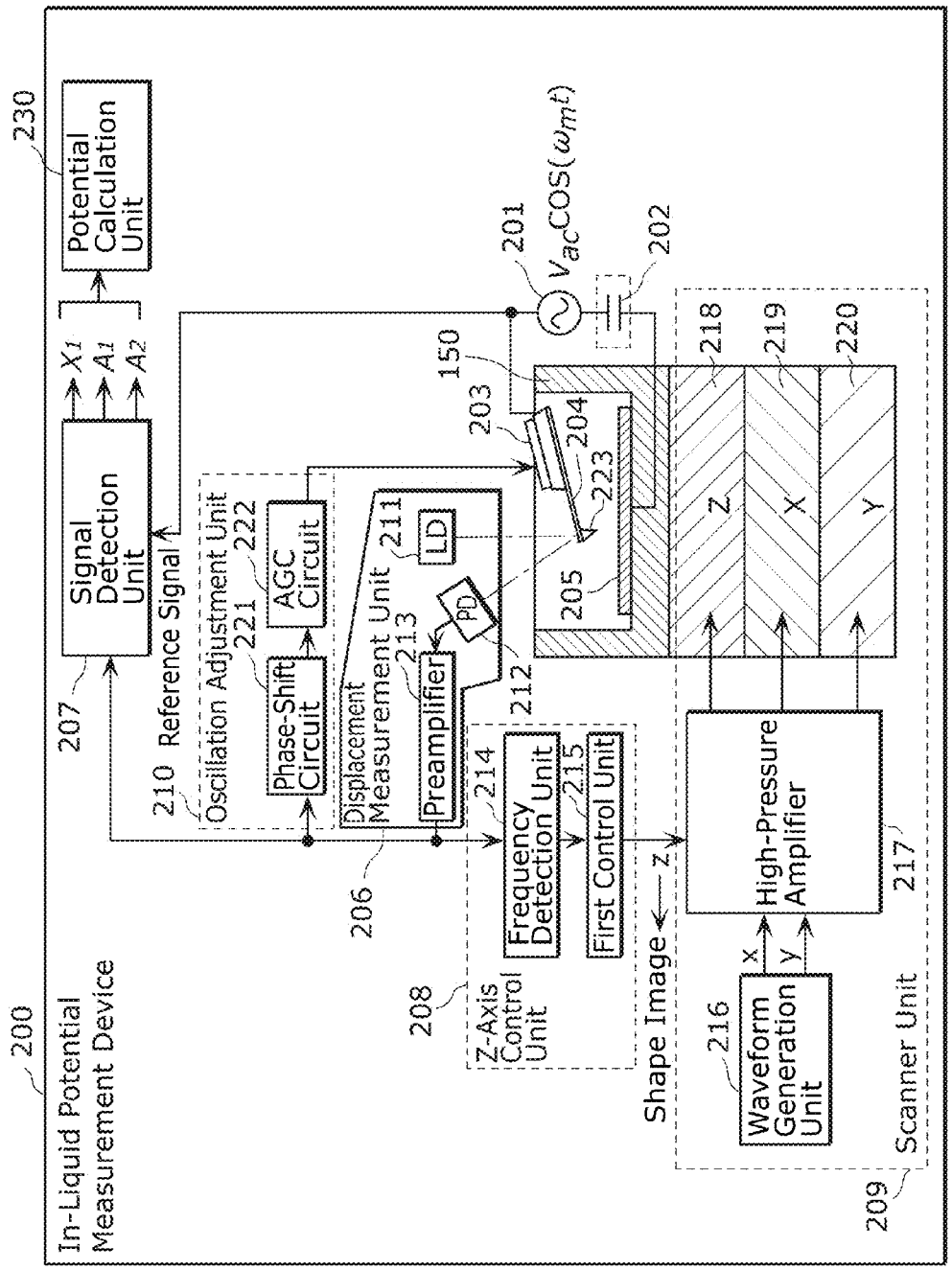
FIG. 1 is a block diagram showing a structure of an in-liquid potential measurement device according to an embodiment of the present invention.

FIG. 1 is a block diagram showing a structure of an in-liquid potential measurement device 200 according to an embodiment of the present invention.

As shown in FIG. 1, the in-liquid potential measurement device 200 includes a measurement jig 150, an AC source 201, a capacitor 202, a cantilever 204, a sample 205, a displacement measurement unit 206, a signal detection unit 207, a z-axis control unit 208, a scanner unit 209, an oscillation adjustment unit 210, and a potential calculation unit 230.

The measurement jig 150 is a jig on which the sample is fixed to measure its potentials. A liquid is filled in the measurement jig 150, and the sample is set in the liquid.

The AC source 201 is a power-supply device that generates an AC voltage, for example, denoted as $V_{ac} \cos(\omega_m t)$ with an amplitude $V_{ac}$ and a frequency $\omega_m$. The AC source 201 applies an AC bias voltage between the probe and the sample to generate an electric field. Here, in the embodiment of the present invention, a value of $\omega_m$ is specifically 10 kHz or higher. The reasons will be described later.

The capacitor 202 removes DC components from the output of the AC source 201 and the like to prevent undesired electrochemical reaction. The provision of the capacitor 202 to the circuit allows the in-liquid potential measurement device 200 according to the present embodiment to apply an AC bias voltage including only AC components between the probe and the sample.

An actuator 203 is also provided as an oscillation device that oscillates the cantilever 204. More specifically, the actuator 203 is so-called piezoelectric elements. The piezoelectric elements have properties of increasing their sizes at a positive voltage and reducing their sizes at a negative voltage. When the actuator 203 receives the AC voltage from the oscillation adjustment unit 210, the actuator 203 is oscillated to oscillate the cantilever 204.

The cantilever 204 has a sharp tip (probe) 223 at its end. The cantilever 204 is a so-called cantilever having one free end with the probe 223 and the other fixed end. The cantilever 204 is made of, for example, silicon, silicon nitride, or the like. In potential measurements, the cantilever 204 is often coated by a conducting metal such as gold or platinum.

The sample 205 is an object to be measured, and set in liquid.

The displacement measurement unit 206 is a processing unit that measures a displacement of the tip of the cantilever 204 in z-axis direction. The in-liquid potential measurement device 200 according to the present embodiment measures electrostatic force $F_{es}$ is exerted between the probe 223 and the sample 205, to be associated with the displacement of the tip of the cantilever 204. The displacement of the tip of the cantilever 204 is used also by the z-axis control unit 208, which will be described later, in position control for keeping constant a distance between the probe 223 and the sample 205.

The displacement measurement unit 206 includes, for example, a Laser Diode (LD) 211, a position detection division photodiode (PD) 212, and a preamplifier 213. The displacement measurement unit 206 causes the position detection division photodiode 212 to receive reflection light of semiconductor laser light emitted from the LD 211 towards the tip of the cantilever 204. According to the displacement of the tip of the cantilever 204 in z-axis direction, a light-receiving position on the position detection division photodiode 212 is changed. The change is retrieved as a voltage change amount via the preamplifier 213. Thereby, the displacement measurement unit 206 measures the displacement of the tip of the cantilever 204.

The signal detection unit 207 is a highly-sensitive AC voltmeter that detects fine AC signals from measured signals including many noises. An example of the signal detection unit 207 is a lock-in amplifier. The in-liquid potential measurement device 200 according to the present embodiment provides the voltage change amount which has been obtained from the displacement measurement unit 206, to the signal detection unit 207 that is a lock-in amplifier which uses the AC voltage applied from the AC source as a reference signal, thereby detecting three AC signals $X_1, A_1$, and $A_2$. $X_1, A_1$, and $A_2$ will be described later in detail.

The z-axis control unit 208 is a control unit that performs feedback control on the scanner unit 209 to keep the oscillation frequency of the cantilever 204 constant. The uneven shape of the surface of the sample 205 varies a distance between the probe 223 and the surface of the sample 205, eventually varying an intensity of interaction force between the probe 223 and the sample 205. As a result, the oscillation frequency of the cantilever 204, which is driven by the actuator 203 to be oscillated at a certain frequency, is changed. Therefore, if the distance between the probe 223 and the sample 205 is controlled to keep constant the oscillation frequency of the cantilever 204, it is possible to keep constant the distance between the probe 223 and the sample 205.

The z-axis control unit 208 includes a frequency detection unit 214 and a first control unit 215. The frequency detection unit 214 obtains the displacement of the tip of the cantilever 204 from the displacement measurement unit 206, and determines an oscillation frequency of the cantilever 204 based on the obtained displacement. The first control unit 215 provides the scanner unit with a control signal. According to the control unit, the scanner unit adjusts a height (z-axis direction) of the measurement jig 150 to keep constant the frequency detected by the frequency detection unit 214. The first control unit 215 is, for example, a Proportional-Integral (PI) control circuit or the like.

A value of the control signal for adjusting the z-axis direction corresponds to the uneven shape of the surface of the sample 205. Therefore, the value is recorded to determine a physical shape (information in a height direction) of the surface of the sample 205.

The scanner unit 209 moves the position of the measurement jig 150 by a distance of approximately a few of nm to dozens of μm, in the three axis directions which are x-axis direction, y-axis direction, and z-axis direction. The move in z-axis direction is to keep constant the oscillation frequency of the cantilever 204, as described earlier. The move in x-axis direction and the move in y-axis direction are to planarly and continuously measure the physical shape and potential distribution of the sample 205.

The scanner unit 209 includes a waveform forming circuit 216, a high pressure amplifier 217, a z-axis scanner 218, an x-axis scanner 219, and a y-axis scanner 220.

Each of the z-axis scanner 218, the x-axis scanner 219, and the y-axis scanner 220 is a piezoelectric element. The high pressure amplifier 217 amplifies (a) control signal (in z-axis direction) outputted as a result of the feedback control from the z-axis control unit 208 and (b) scan signal (in x-axis direction and in y-axis direction) in a planar direction which is generated by the waveform forming circuit 216, and provides the results to the z-axis scanner 218, the x-axis scanner 219, and the y-axis scanner 220 depending on the target axis. As a result, the measurement jig 150 slightly moves.

The oscillation adjustment unit 210 is a processing unit that keeps constant an oscillation amplitude of the cantilever 204. The oscillation adjustment unit 210 includes a phase-shift circuit 221 and an Automatic Gain Control (AGC) circuit 222. When the cantilever 204 is oscillated at or close to the sample surface, various dissipative interaction forces is exerted between the cantilever 204 and the sample. The dissipative interaction forces are interaction forces such as (a) resistance force of solvent around the cantilever when the cantilever is oscillated in the solvent, (b) absorption force and friction force exerted when the cantilever is oscillated and thereby the probe approaches or contacts with the sample surface, and the like. The oscillation energy of the cantilever 204 is thereby constantly changed. In order to keep constant the oscillation amplitude of the cantilever 204, the oscillation adjustment unit 210 uses the AGC circuit 222 to adjust a voltage for exciting the actuator 203. Here, the phase-shift circuit 221 is used to adjust a phase delay of displacement signal detected by the displacement measurement unit 206, with respect to the AC voltage applied to the actuator 203.

The potential calculation unit 230 is a processing unit that receives an output of the signal detection unit 207 and calculates surface potentials of the sample 205 by Equation described later. The calculated surface potentials are arranged to correspond to the scanned x-y plane. As a result, an image of the surface potentials of the sample 205 can be generated.

Next, the description is given for the method of measuring the surface potentials of the sample 205 in a liquid, by using the in-liquid potential measurement device 200 according to the present embodiment.

Figure 6:
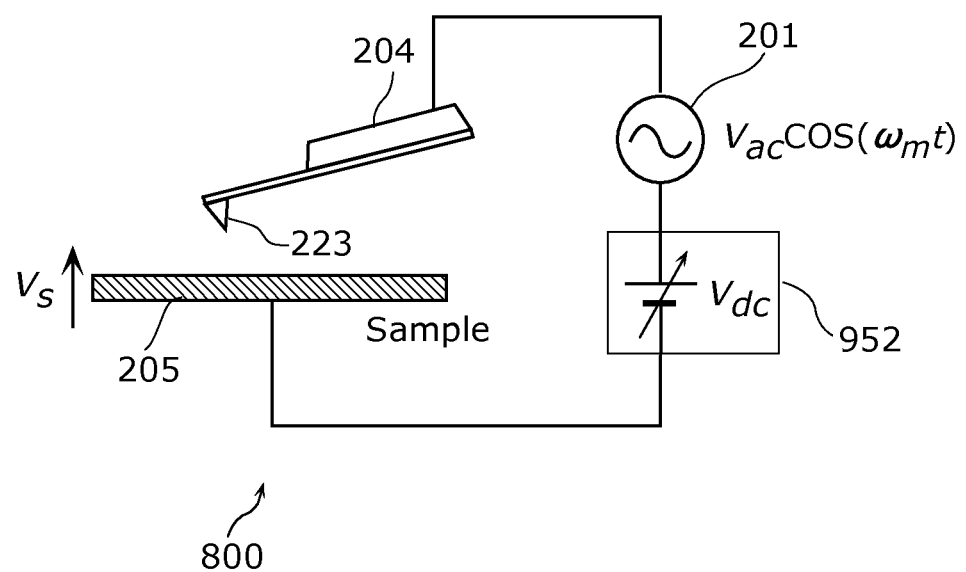
FIG. 6 is a schematic diagram showing the principle of KPFM.

With reference to FIG. 6, the conventional technique has the various problems in measuring surface potentials of the sample 205 in a liquid. The problems occur because a DC bias voltage and a low-frequency AC bias voltage are applied between the probe 223 and the sample 205.

More specifically, the previously-described KPFM and SMM measure the surface potential $V_s$ of the sample 205 by controlling the DC voltage $V_{dc}$ to set the third member in Equation 2 to be zero. Therefore, the DC source 952 is provided to apply a DC bias voltage between the probe 223 and the sample 205.

Furthermore, in the conventional technique, the AC voltage generated by the AC source 201 has a frequency of approximately 1 kHz. This is for the following reasons, (1) If $F_{es}$ is detected as a change in a displacement signal as disclosed in Non Patent Literature 1, a relatively soft cantilever is to be used to obtain enough detection sensitivity. As a result, the resonance frequency of the cantilever is lowered. On the other hand, since the displacement of the cantilever responds only to force components of a frequency lower than the resonance frequency of the cantilever, the frequency of the AC voltage is limited to be lower than the resonance frequency. (2) if $F_{es}$ is detected as a change in a frequency signal as disclosed in Non Patent Literature 2, a detection width of the frequency sensor is generally approximately a few of kHz. As a result, the frequency of the AC voltage is limited to be lower than the frequency.

However, electrochemical reaction, reallocation of solute, solvent, ions, and electric charges, and the like which cause problems in measuring a potential in a liquid progress rather slowly. Therefore, by setting the frequency of the AC bias voltage to 10 kHz or higher, it is possible to significantly suppress such reactions in a liquid.

In the in-liquid potential measurement device 200 according to the present embodiment, only a high-frequency AC bias voltage of 10 kHz or higher is applied between the probe 223 and the sample 205. Therefore, the in-liquid potential measurement device 200 according to the present embodiment can accurately measure surface potentials of the sample 205 even in a liquid. The following explains this in more detail.

$F_{es}$ in the present embodiment is determined by following Equation 3 where $V_{dc}=0$ in Equation 2.

[Math. 3]

$$F_{es} = \frac{1}{2}\frac{\partial C_{ts}}{\partial z}\left[V_s^2 + \frac{1}{2}V_{ac}^2 - 2V_sV_{ac}\cos(\omega_m t) + \frac{1}{2}V_{ac}^2\cos^2(2\omega_m t)\right]$$ (Equation 3)

Here, when an amplitude of $\omega_m$ component (the third member in Equation 3) included in $F_{es}$ is denoted as $A_1$, and an amplitude of $2\omega_m$ component (the fourth member in Equation 3) is denoted as $A_2$, $A_1$ is determined by following Equation 4 and $A_2$ is determined by following Equation 5.

[Math. 4]

$$A_1 = \left|\frac{\partial C_{ts}}{\partial z}V_sV_{ac}\right|$$ (Equation 4)

[Math. 5]

$$A_2 = \left|\frac{1}{4}\frac{\partial C_{ts}}{\partial z}V_{ac}^2\right|$$ (Equation 5)

Here, as described above, the in-liquid potential measurement device 200 according to the present embodiment measures $F_{es}$ in association with a displacement of the tip of the cantilever 204. Therefore, $A_1$ is in association with an amplitude of $\omega_m$ component in the voltage measured by the displacement measurement unit 206.

Furthermore, $A_2$ is in association with an amplitude of $2\omega_m$ component in the voltage measured by the displacement measurement unit 206.

Therefore, values of $A_1$ and $A_2$ can be measured by the signal detection unit 207. As a fraction of these values, an absolute value of $V_s$ can be determined by following Equation 6.

[Math. 6]

$$|V_s| = \frac{A_1}{A_2}\frac{V_{ac}}{4}$$ (Equation 6)

Here, a sign of $V_s$ is positive when a phase difference $\phi$ between the frequency of the $\omega_m$ component in $F_{es}$ and the frequency of the AC bias voltage is 0 degree (in phase), and negative when the phase difference $\phi$ is 180 degrees (reverse phase). Therefore, the signal detection unit 207 detects $X_1 = A_1 \cos \phi$, and determines a sign of $V_s$ from the sign of $X_1$. The potential calculation unit 230 in the in-liquid potential measurement device 200 calculates the surface potential $V_s$ of the sample 205 by following Equation 7.

[Math. 7]

$$V_s = \text{sgn}(X_1)\frac{A_1}{A_2}\frac{V_{ac}}{4}$$ (Equation 7)

It should be noted that the signal detection unit 207 can measure $X_1$, from the voltage measured by the displacement measurement unit 206, as a frequency component having the same phase as that of the AC voltage generated by the AC source 201 among frequency components having the same frequency as that of the AC voltage.

By using Equation 7, the in-liquid potential measurement device 200 according to the present embodiment scans the probe 223 in parallel to the sample 205, while the signal detection unit 207 measures and records the three AC signals $X_1$, $A_1$, and $A_2$. The potential calculation unit 230 can generate an image of surface potentials from these values.

It should be noted that $X_1$ is necessary only to determine the sign of $V_s$ and it is therefore not necessary to always measure $X_1$ for all positions of the probe. For example, if a polarity of a potential difference between the probe 223 and the surface of the sample 205 is not reversed on the overall surface of the sample 205, the signal detection unit 207 can measure $X_1$ only for a single arbitrary position of the probe, and the potential calculation unit 203 can determine the sign of $X_1$ only once.

Next, the characteristics of the in-liquid potential measurement device 200 according to the present embodiment are described in comparison to potential measurement devices according to related arts.

Figure 2:
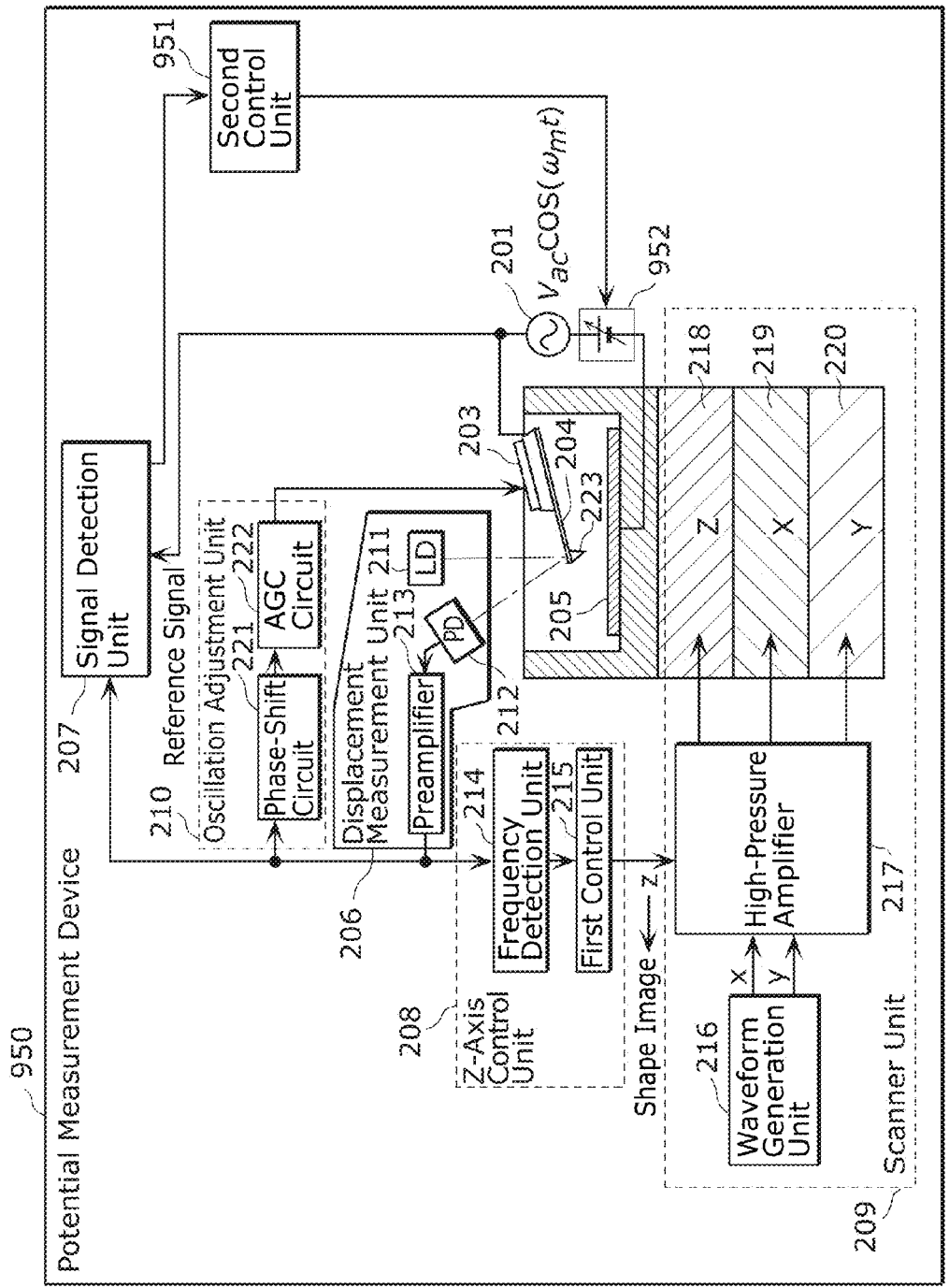
FIG. 2 is a block diagram showing a structure of a potential measurement device according to a related art.
Figure 3:
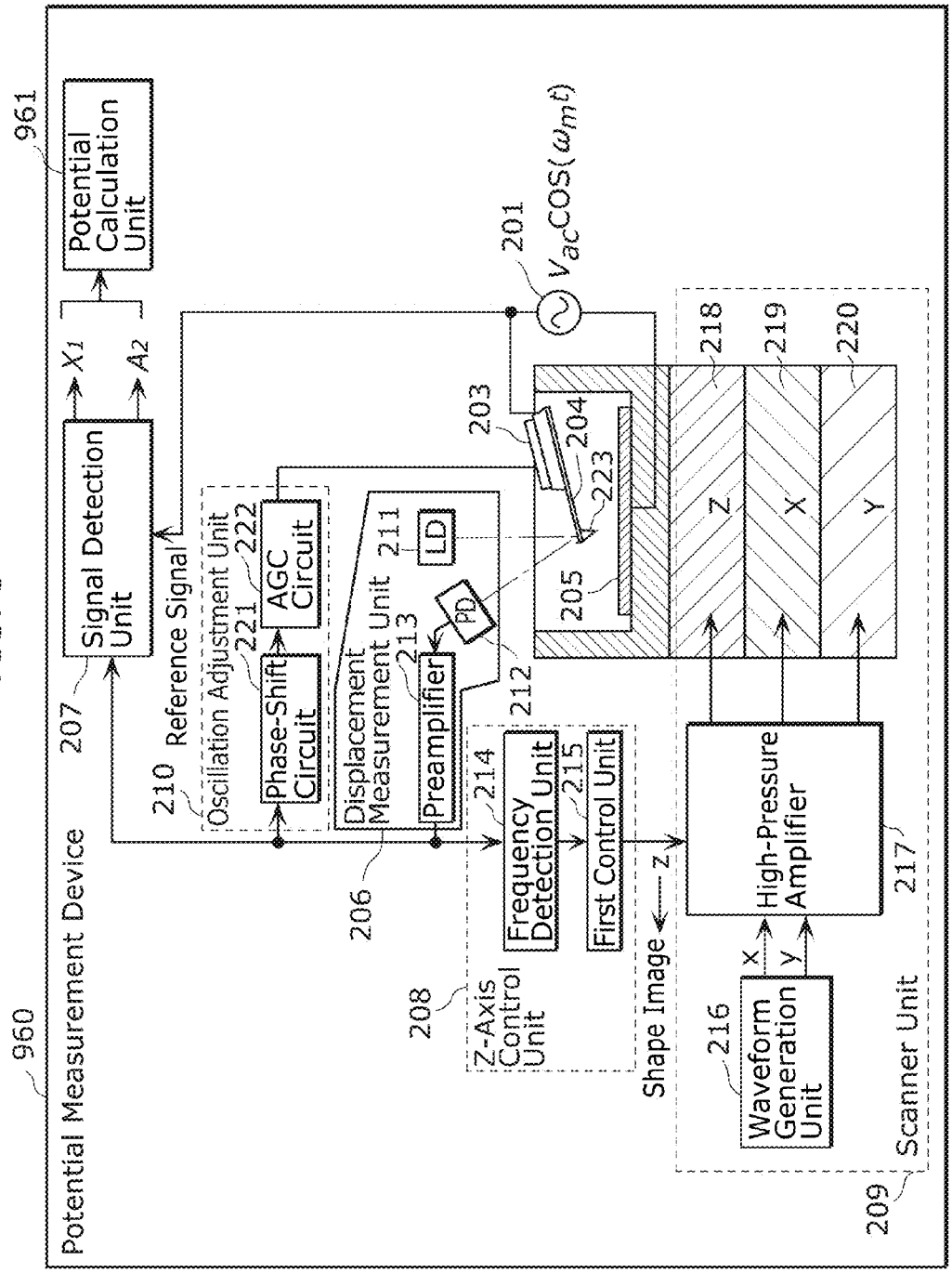
FIG. 3 is a block diagram showing a structure of another potential measurement device according to a related art.

FIG. 2 is a block diagram showing a structure of a potential measurement device 950 according to a related art. FIG. 3 is a block diagram showing a structure of a potential measurement device 960 according to another related art.

Here, the same reference numerals in FIG. 1 are assigned to the identical processing units in FIGS. 2 and 3, and therefore the identical processing units will not be described again below.

FIG. 2 shows the structure in the schematic diagram of FIG. 6 in more detail as the potential measurement device 950. The potential measurement device 950 differs from the in-liquid potential measurement device 200 according to the present embodiment in that a DC source 952 and a second control unit 951 are added to provide a feedback loop from the signal detection unit 207 to the DC source 952.

As described previously, among AC components detected by the displacement measurement unit 206 in associated with respective displacements of the probe 223, the potential measurement device 950 performs feedback control on an output voltage $V_{dc}$ of the DC source 952 to set the third member in Equation 2 to zero.

Therefore, the signal detection unit 207 detects only $\omega_m$ components indicated by the third member in Equation 2, and provides it to the second control unit 951.

The second control unit 951 is, for example, a PI controller or the like. The second control unit 951 controls an output voltage of the DC source 952 to set the third member in Equation 2, which is provided from the signal detection unit 207, to zero.

The DC source 952 generates a DC voltage $V_{dc}$, according to a control signal provided from the second control unit 951.

As described above, in order to control an amplitude of the DC voltage $V_{dc}$, the potential measurement device 950 has a feedback loop using the second control unit 951. The loop itself generally has a frequency of approximately 100 Hz. Therefore, like the in-liquid potential measurement device 200 according to the present embodiment, if the potential measurement device 950 is used in liquid, such a DC or low-frequency voltage causes undesired electrochemical reaction or surface stress as described earlier. Therefore, the measurement technique using the feedback control cannot be used.

In order to address the above, in the in-liquid potential measurement device 200 according to the present embodiment, the signal detection unit 207 measures $X_1$, $A_1$, and $A_2$ without employing the feedback control using the second control unit 951, and based on the measured values, the potential calculation unit 230 calculates surface potentials of the sample 205.

On the other hand, the potential measurement device 960 according to the related art shown in FIG. 3 (for example, see Non Patent Literature 3) does not have a feedback loop for controlling a DV voltage $V_{dc}$, like the in-liquid potential measurement device 200 according to the present embodiment.

However, the potential measurement device 960 differs from the in-liquid potential measurement device 200 according to the present embodiment in that the signal detection unit 207 detects and outputs signals $X_1$ and $A_2$ only, and that the potential calculation unit 961 performs calculation in a different manner.

More specifically, the potential calculation unit 961 included in the potential measurement device 960 determines surface potential $V_s$ of the sample 205 based on $X_1$ and $A_2$ provided from the signal detection unit 207, by using following Equation 8.

[Math. 8]

$$V_s = \frac{A_1}{A_2} \frac{V_{ac}}{4} \quad \text{(Equation 8)}$$

Equation 8 has the following relationship with Equation 7 used in calculation of the potential calculation unit 230 in the in-liquid potential measurement device 200 according to the present embodiment.

Also in the in-liquid potential measurement device 200 according to the present embodiment, ideally, the signal detection unit 207 is desired to detect $X_1 = A_1 \cos \phi$ and use an equation (namely, Equation 8) in which $A_1$ in Equation 6 is replaced by $X_1$. In this case, since a sign of $V_s$ can be calculated at the same time, it is not necessary, like Equation 7, to calculate only the sign of $V_s$ from $X_1$ (in other words, calculate $\text{sgn}(X_1)$). As a result, the measurement of $A_1$ is also unnecessary.

However, while the aim of the conventional arts is to measure potentials of the sample 205 set in vacuum (nearly ideal state for calculation) or in semi-vacuum, the aim of the in-liquid potential measurement device 200 according to the present embodiment is to measure potentials of the sample 205 in a liquid.

Here, in comparison to the measurement in vacuum or air, a sensitivity in detecting force is deteriorated in measurements in liquid. Therefore, a signal-to-noise ratio of the measured signal $X_1$ is deteriorated. In addition, there is a possibility that, in a real circuit, a phase delay or the like of a AC voltage occurs and cow has an intermediate value except +1 and −1. Therefore, errors caused by these factors which are not big problems in the conventional measurements in vacuum and semi-vacuum are significantly increased in measurement in a liquid.

In order to prevent such measurement errors caused by error factors, the in-liquid potential measurement device 200 according to the present embodiment (1) calculates, as seen in FIG. 7, an absolute value of the surface potential $V_s$ from the measured values of $A_1$ and $A_2$ by Equations 4 and 5, as also (2) separately calculates a sign of $V_s$ from a sign of $X_1$.

As described above, the in-liquid potential measurement device 200 according to the present embodiment includes: a probe 223; an electrostatic force measurement unit (namely, the displacement measurement unit 206 and the cantilever 204) that measures (detects) a voltage corresponding to electrostatic force between the probe 223 and the sample 205; an AC source 201 that applies an AC voltage between the probe 223 and the sample 205; and the signal detection unit 207 that detects signal of certain frequency component from the voltages measured by the electrostatic force measurement unit, and outputs a value corresponding to the detected signal.

Here, the frequency of the AC voltage generated by the AC source 201 is assumed to be 10 kHz or higher. Furthermore, the signal detection unit 207 detects, from the voltage measured by the electrostatic force measurement unit, (1) an amplitude of a frequency component having the same frequency as that of the AC voltage generated by the AC source 201, (2) an amplitude of a frequency component having a frequency that is twice as high as that of the AC voltage, and (3) a frequency component having a same phase as a phase of the frequency that is the same as the frequency of the AC voltage.

As a result, the in-liquid potential measurement device 200 according to the present embodiment can measure potentials on surface in a liquid.

It is also possible that the in-liquid potential measurement device 200 according to the present embodiment may include a potential calculation unit 230 that calculates potentials on the surface of the sample 205 from values generated by the signal detection unit 207. Here, the potential calculation unit 230 calculates $V_s$ that is the surface potential of the sample 205, by Equation $V_s = \text{sgn}(X_1) \times (A_1/A_2) \times (V_{ac}/4)$, where (1) $A_1$ is the amplitude of the frequency component having the same frequency as the frequency of the AC voltage applied by the AC source, which is detected from the voltage measured by the electrostatic force measurement unit, (2) $A_2$ is the amplitude of the frequency component having the frequency that is twice as high as the frequency of the AC voltage, the amplitude being detected from the voltage measured by the electrostatic force measurement unit, (3) $X_1$ is the frequency component having the same phase as the phase of the frequency that is the same as the frequency of the AC voltage, the frequency component being detected from the voltage measured by the electrostatic force measurement unit, and (4) $V_{ac}$ is an amplitude of the AC voltage.

Next, the description is given for results of experiments where the in-liquid potential measurement device 200 measures potentials of the sample 205 in a liquid.

Each of FIGS. 4A to 4D is a graph plotting a relationship among $A_1$, $A_2$, and $V_{ac}$ which are measured in a liquid. More specifically, either $A_1$ or $A_2$ is measured on a Highly Oriented Pyrolytic Graphite (HOPG) substrate in natrium chloride (NaCl) solution of 1 mM. The vertical axis represents the measurement results, and the horizontal axis represents $V_{ac}$ [V] that is a an AC bias voltage used in target measurement.

More specifically, FIG. 4 is the first graph plotting a relationship between $A_1$ and $V_{ac}$ which are measured in a liquid. FIG. 4B is the first graph plotting a relationship between $A_2$ and $V_{ac}$ which are measured in a liquid. FIG. 4C is the second graph plotting a relationship between $A_1$ and $V_{ac}$ which are measured in a liquid. FIG. 4D is the second graph plotting a relationship between $A_2$ and $V_{ac}$ which are measured in a liquid.

Figure 4A:
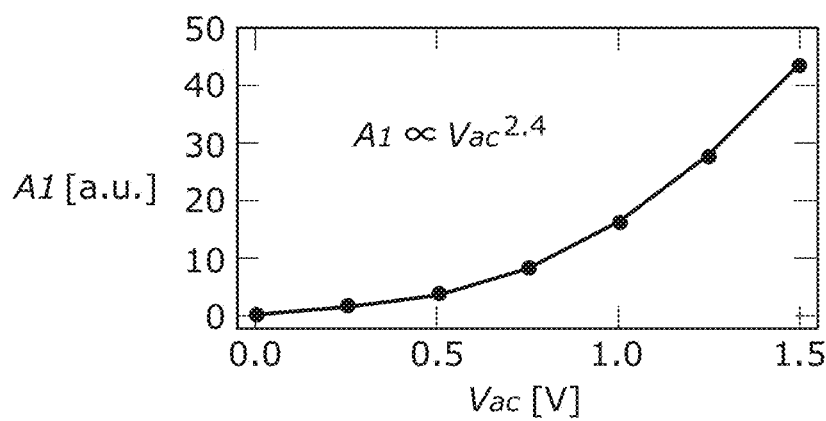
FIG. 4A is the first graph plotting a relationship between $A_1$ and $V_{ac}$ which are measured in a liquid.
Figure 4B:
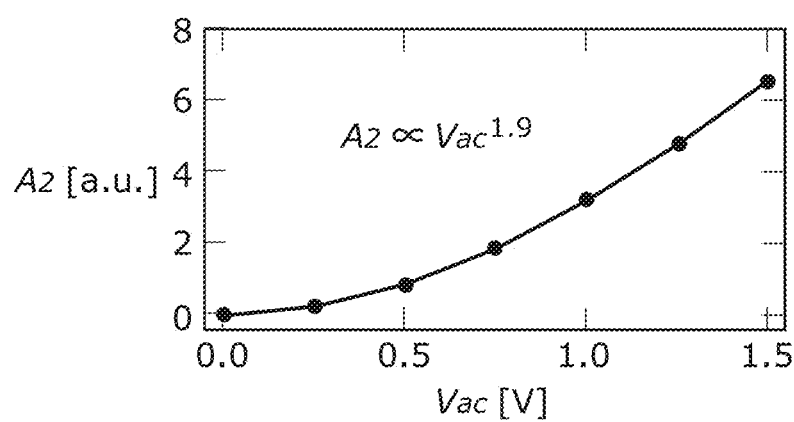
FIG. 4B is the first graph plotting a relationship between $A_2$ and $V_{ac}$ which are measured in a liquid.
Figure 4C:
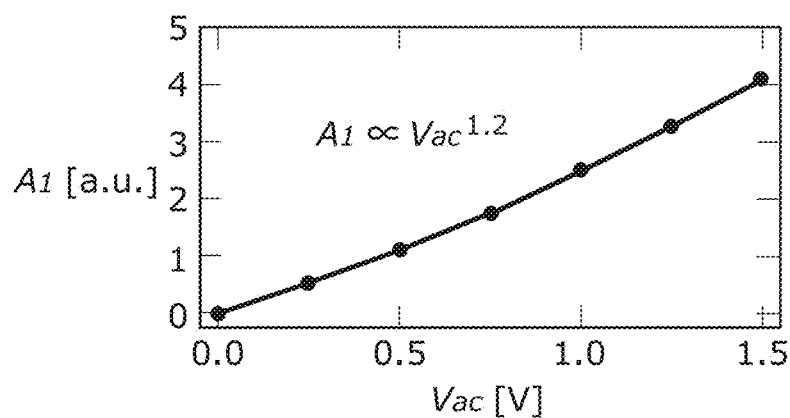
FIG. 4C is the second graph plotting a relationship between $A_1$ and $V_{ac}$ which are measured in a liquid.
Figure 4D:
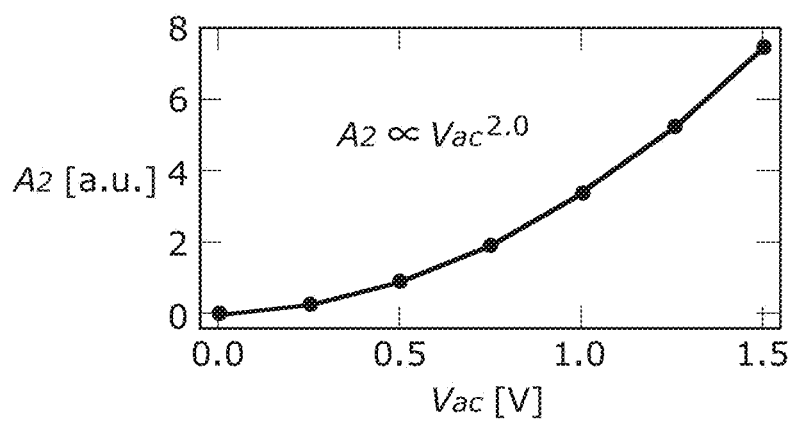
FIG. 4D is the second graph plotting a relationship between $A_2$ and $V_{ac}$ which are measured in a liquid.

In short, FIGS. 4A and 4C show results of measuring $A_1$, while FIGS. 4B and 4D show results of measuring $A_2$. FIGS. 4A and 4B show measurement results in the case where a frequency of the AC bias voltage generated by the AC source 201 is 1 kHz. On the other hand, FIGS. 4C and 4D show measurement results in the case where a frequency of the AC bias voltage generated by the AC source 201 is 30 kHz.

If the electrostatic force $F_{es}$ is dominant in interaction force of the cantilever 204 which is caused by the AC bias voltage (like the potential measurement in vacuum), $A_1$ must be proportional to $V_{ac}$, and $A_2$ must be proportional to a square of $V_{ac}$ according to Equations 4 and 5, if not, due to electrochemical reaction and ion reallocation, interaction force is exerted by a factor different from a static electric charge amount.

Here, as seen in FIG. 4A, when the frequency of the AC bias voltage is 1 kHz, $A_1$ is not at all proportional to $V_{ac}$. This means that interaction force is exerted by a different factor due to electrochemical reaction and ion reallocation.

On the other hand, as seen in FIG. 4C, when the frequency of the AC bias voltage is 30 kHz, $A_1$ is almost proportional to $V_{ac}$ ($A_1$ is proportional to 1.2 power of $V_{ac}$). This means that influence of $F_{es}$ is dominant.

In comparing FIG. 4B to FIG. 4D, it is seen that the measurement accuracy is higher at frequency of 30 kHz for the AC bias voltage than at 1 kHz, and therefore $A^2$ is proportional to a square of $V_{ac}$.

The above results mean that setting the frequency of the AC bias voltage to 10 kHz or higher is effective to suppress the conventional problems of electrochemical reaction and reallocation of solute and solvent.

Each of FIG. 5A to 5E is a diagram showing a result of measuring a molecular film in a liquid by using the in-liquid potential measurement device 200 according to the embodiment of the present invention. More specifically, a HOPG substrate on which a dodecylamine molecular film is formed is placed as the sample 205 on the measurement jig 150, and the sample 205 is observed in NaCl solution of 1 mM.

Figure 5A:
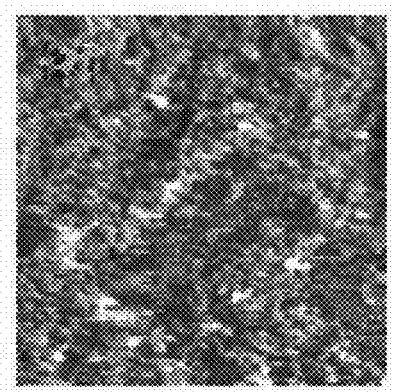
FIG. 5A is a diagram of a surface shape image of a sample which is generated by the in-liquid potential measurement device according to the embodiment of the present invention by converting a shift amount in a z-axis direction, which is provided from a z-axis control unit, into color information and plotting the color information on a scan surface in an x-y axis.
Figure 5B:
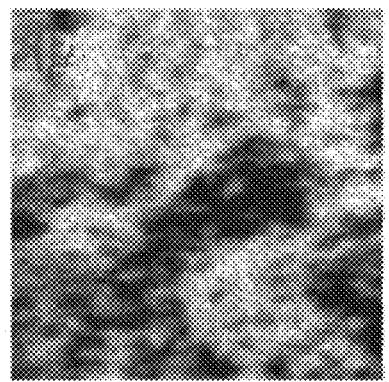
FIG. 5B is a diagram of an $A_1$ image of a sample which is generated by the in-liquid potential measurement device according to the embodiment of the present invention by converting a value of $A_1$, which is provided from a signal detection unit, into color information and plotting the color information on a scan surface in an x-y axis.
Figure 5C:
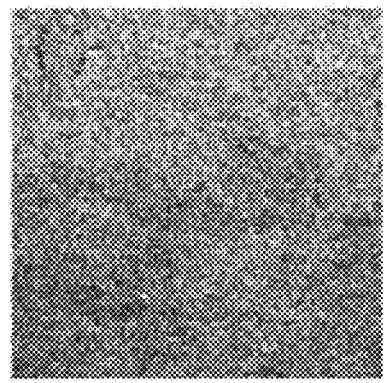
FIG. 5C is a diagram of an $A_2$ image of a sample which is generated by the in-liquid potential measurement device according to the embodiment of the present invention by converting a value of $A_2$, which is provided from a signal detection unit, into color information and plotting the color information on a scan surface in an x-y axis.
Figure 5D:
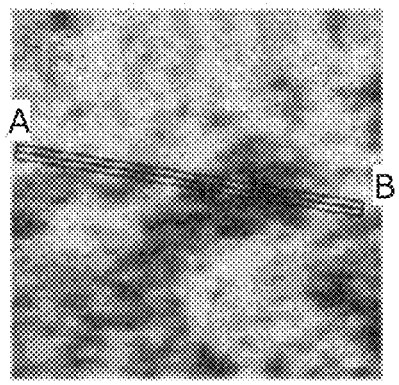
FIG. 5D is a diagram of a surface potential image of a sample which is generated by the in-liquid potential measurement device according to the embodiment of the present invention by converting surface potentials, which are calculated by a potential calculation unit, into color information and plotting the color information on a scan surface in an x-y axis.
Figure 5E:
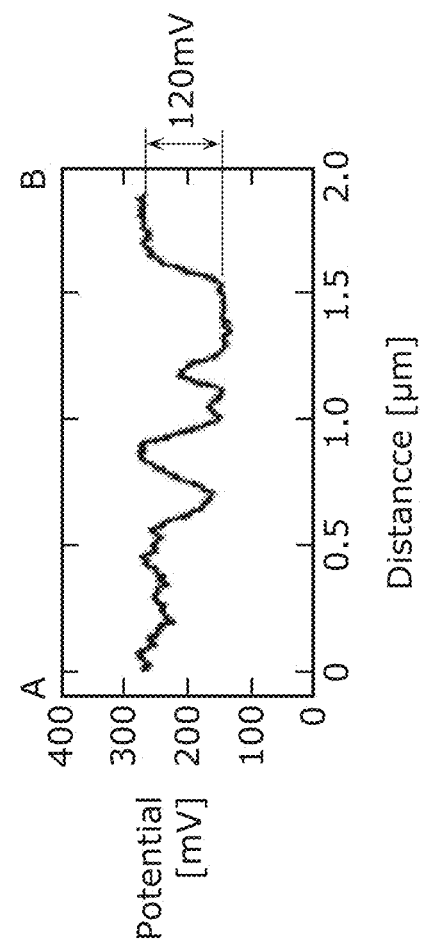
FIG. 5E is a graph plotting a profile taken along line A-B in the surface potential image shown in FIG. 5D.

More specifically, FIG. 5A shows an image of a surface shape of the sample 205 (surface shape image). The image is generated by converting a move amount in z-axis direction which is outputted from the z-axis control unit 208 into color information, and then plotting the color information on a scan surface in x-y axis. FIG. 5B shows an image of $A_1$ of the sample 205 ($A_1$ image). The $A_1$ image is generated by converting a value of $A_1$ provided from the signal detection unit 207, into color information, and then plotting the color information on a scan surface in x-y axis. FIG. 5C shows an $A_2$ image of the sample 205 ($A_2$ image). The $A_2$ image is generated by converting a value of $A_2$ provided from the signal detection unit 207, into color information, and then plotting the color information on a scan surface in x-y axis. FIG. 5D shows an image of surface potentials of the sample 205 (surface potential image). The surface potential image is generated by converting surface potentials calculated by the potential calculation unit 230 into color information, and then plotting the color information on a scan surface in x-y axis. FIG. 5E shows a line profile taken along line A-B in the surface potential image shown in FIG. 5D. In FIG. 5E, the vertical axis represents a potential [mV] detected by the in-liquid potential measurement device 200, while the horizontal axis represents a straight-line distance [μm] from point A to point B.

Here, it is known that, having a high affinity with an HOPG surface, dodecylamine molecules form a stable monomolecular layer on the HOPG. It is also known that multiple molecular layers are unlikely to be stable. Under the above observation, it is considered that a part observed as low in the surface shape image of FIG. 5A is a surface of a dodecylamine molecular layer, and a part observed as high is a surface of dodecylamine molecular physisorbed layer.

In practice, a structure of the part looked high is clearly uneven and unstable, which shows that this structure model is reasonable.

In comparing the surface shape image shown in FIG. 5A to the surface potential image shown in FIG. 5D, a part looked as high in the surface shape image roughly corresponds to a part having a high potential. For dodecylamine molecule in neutral solution, it is considered that an amino group at the end is ionized and the dodecylamine molecule is charged positively. Therefore, it is expected that a part looked high in the surface shape image shows a part having a high potential with a large number of sorbed molecules per unit area.

Furthermore, some parts not having unevenness in the surface shape image have changes in surface potentials, and vice versa. However, for the following reasons, it is difficult to consider that the surface shape image completely matches the surface potential image. Therefore, the obtained results seem rather reasonable.

More specifically, it is expected that negative ions of an amount enough to cancel positive electric charges of dodecylamine molecules sorbed to the surface of the sample 205 are distributed at or close to the surface of the sample 205, thereby forming an electric double layer. It is therefore considered that a part of dodecylamine molecules is not locally ionized and the surface unevenness does not completely match the surface potential distribution.

Moreover, as seen in FIG. 5E, a difference in measured value between a part with the highest potential and a part with the lowest potential is approximately 120 mV. Here, since the difference in a surface potential is expected to have a value on the order of mV, it is reasonable that the difference does not have a value on the order of V or µV order, but a value on the order of mV.

In addition, the potential image shown in FIG. 5D shows contrast at the nanoscale. This means that the in-liquid potential measurement device 200 can control a distance between the sample 205 and the probe 223 at the nanoscale. For the above reasons, it is considered that the in-liquid potential measurement device 200 according to the present embodiment can measure potential distribution of the sample 205 in a liquid.

Thus, although the in-liquid potential measurement device 200 according to the embodiment of the present invention has been described as above, the present invention is not limited to the embodiment.

In the in-liquid potential measurement device 200 according to the present embodiment, the z-axis control unit 208 performs feedback control on the distance between the probe 223 and the sample 205 to keep constant the resonant frequency changes of the cantilever. However, in the static mode of AFM, the feedback control of the z-axis control unit 208 may be performed to keep constant the displacement of the cantilever. On the other hand, in the dynamic mode of AFM, the feedback control of the z-axis control unit 208 may be performed to keep constant an amplitude or phase of oscillation of the cantilever 204. In other words, the in-liquid potential measurement device 200 can use any one of the methods of controlling the distance between the probe 223 and the sample 205, which are used in the static mode and the dynamic mode of AFM.

Furthermore, in the in-liquid potential measurement device 200 according to the present embodiment, the displacement measurement unit 206 detects, as a displacement of the cantilever, electrostatic force induced by an AC bias voltage. However, the electrostatic force induced by an AC bias voltage may be detected based on resonance frequency, oscillation amplitude, or phase of the cantilever. In this case, sine a frequency of the AC bias voltage is required to be 10 kHz or higher, a processing unit for detecting frequency, amplitude, or phase instead of the displacement measurement unit 206 needs to have a detection width of 20 kHz or higher that is a frequency of the second-order harmonic.

It should also be noted that it has been described that the in-liquid potential measurement device 200 according to the present embodiment uses the cantilever 204 with the probe 223 to measure height information relating to a three-dimensional shape of the sample surface as well as surface potentials of the sample 205. However, the cantilever 204 with the probe 223 is not always necessary, if only the surface potentials of the sample 205 are to be measured. Instead of the cantilever 204, it is possible to use, for example, an electrode having an inner diameter equal to or shorter than that of the measurement jig 150.

In other words, the in-liquid potential measurement device 200 according to the present embodiment may include such an electrode instead of the cantilever 204 with the probe 223, and include an electrostatic force measurement unit instead of the displacement measurement unit 206 so as to measure electrostatic force between the electrode and the sample 205 by one of the above-described methods.

It should also be noted that the in-liquid potential measurement device 200 according to the present embodiment technically measures potential distribution in a space at or close to the sample 205, and that the above-described "potential on the surface (surface potential)" is correctly "potential at or closer to the surface". However, it can be actually considered as potential on the surface of the sample 205, and therefore referred to as "potential on the surface (surface potential)".

It should also be noted that it has been described that the in-liquid potential measurement device 200 according to the present embodiment controls an AC bias voltage via the capacitor 202. However, it is also possible to further provide a reference electrode or an opposite electrode to combine such an electrode with electrochemistry setup for controlling the electrochemical potentials of the cantilever 204 or the sample 205 by bi-potentiostat. In this case, an AC bias voltage can be applied using a bias tee or a transformer. It is therefore possible to measure potential distribution $V_s$ while electrochemical potentials between the probe 223 and the sample 205 are stably controlled, and also possible to examine a dependency regarding how potential distribution $V_s$ is changed depending on the electrochemical potential of the sample 205.

It should also be noted that it has been described that the in-liquid potential measurement device 200 according to the present embodiment includes the potential calculation unit 230 that calculates a potential image from measured values $X_1$, $A_1$, and $A_2$ which are provided from the signal detection unit 207. However, the in-liquid potential measurement device 200 may not always include the potential calculation unit 230. For example, it is also possible that measured values $X_1$, $A_1$, and $A_2$ which are generated by the signal detection unit 207 are provided to an external device equivalent to the potential calculation unit 230, so that the external device can calculate potential $V_s$ in association with x-y coordinates in the measurement. Thereby, a potential image can be generated. For example, it is possible that, as the experiment results shown in FIGS. 5A to 5D, respective two-dimensional images are generated based on the measured values $X_1$, $A_1$, and $A_2$, and then a value of each point included in each of the images is provided to the device equivalent to the potential calculation unit 230 to generate a potential image.

The in-liquid potential measurement device 200 does not necessarily include the capacitor 202, the z-axis control unit 208, the scanner unit 209, and the oscillation adjustment unit 210.

Even if the capacitor 202 is not provided, setting of the AC voltage generated by the AC source 201 to have a frequency of 10 kHz or higher can suppress reaction, such as electrochemical reaction and reallocation of solute, solvent, ions, and electric charges, which causes problems in potential measurement. Therefore, the same effects as those of the present invention can be offered without the capacitor 202. However, the provision of the capacitor 202 can more completely prevent application of a DC voltage, thereby completely suppressing reaction in liquid and eventually improving a measurement accuracy.

Furthermore, even if the scanner unit 209 is not provided, it is possible to measure a potential of one point on the sample 205 and offer the effects of the present invention by serving as the in-liquid potential measurement device. However, the provision of the scanner unit 209 can measure potentials by scanning across an x-y plane. Furthermore, the provision of the z-axis control unit 208 can obtain information in a height direction of the sample 205, thereby providing an atomic force microscope having an in-liquid potential measurement function.

Even if the AGC circuit 222 is not provided, it is possible to keep an oscillation amplitude of the cantilever 204 constant to some extent when dissipative interaction force is small. Therefore, it is possible to offer the same effects as the case of providing the AGC circuit 222. However, the provision of the AGC circuit 222 can more accurately keep the amplitude constant, thereby improving an accuracy in measuring potentials.

It should be noted that each of the processing units included in the in-liquid potential measurement device 200 according to the above-described embodiment is typically implemented into a LSI that is an integrated circuit. These may be integrated separately, or a part or all of them may be integrated into a single chip.

Here, the integrated circuit is referred to as a LSI, but the integrated circuit can be called an IC, a system LSI, a super LSI or an ultra LSI depending on their degrees of integration.

It should also be noted that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit.

It is also possible that a part of all of the functions of the in-liquid potential measurement device 200 according to the above-described embodiment may be implemented by executing a program by a processor such as a CPU.

The present invention may be the above-mentioned program or a recording medium on which the program is recorded. The program may be, of course, distributed via a transmission medium such as the Internet.

It should also be noted that the above-described connection relationships among the structural elements are merely examples for explaining the present invention in detail, and the connection relationship for realizing the functions of the present invention is not limited to them.

Furthermore, those skilled in the art will be readily appreciate that various modifications are possible in the exemplary embodiment without materially departing from the novel teachings and advantages of the present invention.

INDUSTRIAL APPLICABILITY

The present invention is applicable to potential measurement devices using atomic force microscope, and in particularly to in-liquid potential measurement devices.

REFERENCE SIGNS LIST 150 measurement jig
200 in-liquid potential measurement device
201 AC source
202 capacitor
203 actuator
204 cantilever
205 sample
206 displacement measurement unit
207 signal detection unit
208 z-axis control unit
209 scanner unit
210 oscillation adjustment unit
211 LD
212 PD
213 preamplifier
214 frequency detection unit
215 first control unit
216 waveform forming circuit
217 high pressure amplifier
218 z-axis scanner
219 x-axis scanner
220 y-axis scanner
221 phase-shift circuit
222 AGC circuit
223 probe
230, 961 potential calculation unit
800 KPFM
950, 960 potential measurement device
951 second control unit
952 DC source

The invention claimed is:

1. An in-liquid potential measurement device that measures a surface potential of a sample in a liquid, the in-liquid potential measurement device comprising:
a cantilever having a cantilever structure including a free end with a sharp probe that is an electrode;
an electrostatic force measurement unit configured to measure a voltage corresponding to electrostatic force between the probe and the sample;
an AC source that applies an AC voltage between the probe and the sample; and
a signal detection unit configured to detect signals of certain frequency components from the voltage measured by the electrostatic force measurement unit, and output values corresponding to the detected signals,
wherein a frequency of the AC voltage applied by the AC source is 10 kHz or higher, and
wherein the signal detection unit is configured to detect, from the voltage measured by the electrostatic force measurement unit, (1) an amplitude of a signal having a frequency component that is a same frequency as a frequency of the AC voltage applied by the AC source, (2) an amplitude of a signal having a frequency component that is a frequency that is twice as high as the frequency of the AC voltage, and (3) a frequency component having a same phase as a phase of the frequency that is the same as the frequency of the AC voltage.

2. The in-liquid potential measurement device according to claim 1, further comprising a capacitor in a closed circuit that applies a bias voltage between the probe and the sample.

3. The in-liquid potential measurement device according to claim 1, further comprising a potential calculation unit configured to calculate the surface potential of the sample based on the values outputted by the signal detection unit,
wherein the potential calculation unit is configured to calculate $V_s$ that is the surface potential of the sample, by Equation $V_s = \text{sgn}(X_1) \times (A_1/A_2) \times (V_{ac}/4)$,
where (1) $A_1$ is the amplitude of the signal having the frequency component that is the same frequency as the frequency of the AC voltage applied by the AC source, the amplitude $A_1$ being detected from the voltage measured by the displacement measurement unit, (2) $A_2$ is the amplitude of the signal having the frequency component that is the frequency that is twice as high as the frequency of the AC voltage, the amplitude $A_2$ being detected from the voltage measured by the displacement measurement unit, (3) $X_1$ is the frequency component having the same phase as the phase of the frequency that is the same as the frequency of the AC voltage, the frequency component $X_1$ being detected from the voltage measured by the displacement measurement unit, and (4) $V_{ac}$ is an amplitude of the AC voltage.

4. An atomic force microscope that measures (a) a surface potential of a sample in a liquid and (b) a height of a surface of the sample, the atomic force microscope comprising:

a cantilever having a cantilever structure including a free end with a sharp probe;

an AC source that applies a bias voltage between the sharp probe and the sample;

an actuator that oscillates the cantilever;

a displacement measurement unit configured to measure a voltage corresponding to a displacement of the end of the cantilever;

a signal detection unit configured to detect signals of certain frequency components from the voltage measured by the displacement measurement unit, and output values of the detected signals;

a scanner unit configured to adjust a distance between the sharp probe and the sample; and a control unit configured to obtain an oscillation frequency of the cantilever oscillated by the actuator from the voltage measured by the displacement measurement unit, and perform feedback control on the scanner unit to keep the obtained oscillation frequency of the cantilever constant, wherein a frequency of an AC voltage applied by the AC source is 10 kHz or higher, wherein the signal detection unit is configured to detect, from the voltage measured by the displacement measurement unit, (1) an amplitude of a signal having a frequency component that is a same frequency as a frequency of the AC voltage applied by the AC source, (2) an amplitude of a signal having a frequency component that is a frequency that is twice as high as the frequency of the AC voltage, and (3) a frequency component having a same phase as a phase of the frequency that is the same as the frequency of the AC voltage, and wherein the control unit is configured to output, as the height of the surface of the sample, an amount of adjustment in the distance between the sharp probe and the sample which is performed by the scanner unit.

\* \* \* \* \*